(12) United States Patent
O'Connor et al.

(10) Patent No.: US 10,090,660 B2
(45) Date of Patent: *Oct. 2, 2018

(54) WIRE PASS THROUGH DEVICE

(71) Applicant: Manufacturing Resources International, Inc., Alpharetta, GA (US)

(72) Inventors: Kevin O'Connor, Duluth, GA (US); Mike Brown, Woodstock, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,917

(22) Filed: Apr. 14, 2017

(65) Prior Publication Data

US 2017/0222421 A1    Aug. 3, 2017

Related U.S. Application Data

(63) Continuation of application No. 14/746,271, filed on Jun. 22, 2015, now Pat. No. 9,627,875, which is a continuation of application No. 13/569,753, filed on Aug. 8, 2012, now Pat. No. 9,065,259.

(51) Int. Cl.
*H02G 3/02* (2006.01)
*H02G 15/013* (2006.01)
*H02G 3/22* (2006.01)
*H02G 3/08* (2006.01)

(52) U.S. Cl.
CPC ............ *H02G 15/013* (2013.01); *H02G 3/02* (2013.01); *H02G 3/088* (2013.01); *H02G 3/22* (2013.01)

(58) Field of Classification Search
CPC ........ H02G 15/013; H02G 3/088; H02G 3/02; H02G 3/22
USPC ......................................................... 277/606
See application file for complete search history.

(56) References Cited

U.S. PATENT DOCUMENTS

| 1,851,940 | A | * | 3/1932 | Williams | ................. | F16L 5/08 138/89 |
| 2,612,392 | A | | 9/1952 | Dempsey | | |
| 2,800,242 | A | * | 7/1957 | Sauthoff | .................. | E03B 5/06 220/235 |
| 2,813,692 | A | * | 11/1957 | Peterson | ............. | H01B 17/306 174/152 R |
| 3,655,907 | A | * | 4/1972 | Philibert | ............. | H02G 15/013 138/89 |

(Continued)

*Primary Examiner* — Nathan Cumar
(74) *Attorney, Agent, or Firm* — Standley Law Group LLP

(57) ABSTRACT

The embodiments herein provide a device for sealing an interface having an opening for a wire to pass through the interface. A pair of sealing blocks may be used where one block contains a protrusion and the opposing block contains a recess. The protrusion and recess preferably have an apex with a round having approximately the same dimension as the radius of the wire. A pair of posts may be positioned on opposing sides of the opening. One sealing block may contain an aperture for accepting one of the posts while the second sealing block may contain an aperture for accepting the opposing post. The posts may be threaded so that they can accept a threaded fastener. Exemplary embodiments may utilize mounting plates which may contain a flange such that squeezing the opposing flanges together can cause inward forces on the sealing blocks.

17 Claims, 5 Drawing Sheets

(56) References Cited

U.S. PATENT DOCUMENTS

| | | | | |
|---|---|---|---|---|
| 4,140,338 A | * | 2/1979 | Kazmierski, Jr. | F16L 59/21 138/149 |
| 4,233,697 A | * | 11/1980 | Cornwall | E03D 11/16 138/89 |
| 4,622,436 A | * | 11/1986 | Kinnan | H02G 15/04 174/23 R |
| 4,907,301 A | * | 3/1990 | Tucker | E03D 11/16 285/56 |
| 5,236,227 A | * | 8/1993 | Adams | F16L 39/00 285/27 |
| 7,121,557 B2 | * | 10/2006 | Christie | F16J 15/025 15/25 |
| 2006/0137294 A1 | * | 6/2006 | Waits, Jr. | F16B 5/01 52/787.1 |

* cited by examiner

WIRE PASS THROUGH DEVICE

CROSS-REFERENCE TO RELATED APPLICATIONS

This application is a continuation of U.S. patent application Ser. No. 14/746,271 filed on Jun. 22, 2015, which is a continuation of U.S. patent application Ser. No. 13/569,753 filed on Aug. 8, 2012, now U.S. Pat. No. 9,065,259 issued on Jun. 23, 2015. Both aforementioned applications are incorporated by reference as if fully recited herein.

TECHNICAL FIELD

Embodiments generally relate to a device for sealing an interface, through which wires must pass.

BACKGROUND OF THE ART

In various electrical devices, there is frequently a need to pass wiring through an interface (sometimes a plate, the wall of a housing, or any other surface through which wires must pass). Sensitive electronic components may be placed within a sealed or waterproof portion of the device while sensors, fans, encoders, pumps, or other devices may be in electrical communication with these components and they might be positioned in places which are subject to harsher environmental conditions. As the wiring passes through the sealed or waterproof portion and enters the harsher environmental portion, it may be desirable to prohibit water, dust, dirt, or other contaminates from passing into the protected portion of the device.

SUMMARY OF THE EXEMPLARY EMBODIMENTS

The embodiments herein provide a device for sealing an interface having an opening for a wire to pass through the interface. A pair of sealing blocks may be used where one block contains a protrusion and the opposing block contains a recess. The protrusion and recess preferably have an apex with a round having approximately the same dimension as the radius of the wire. A pair of posts may be positioned on opposing sides of the opening. One sealing block may contain an aperture for accepting one of the posts while the second sealing block may contain an aperture for accepting the opposing post. The posts may be threaded so that they can accept a threaded fastener.

Exemplary embodiments may utilize mounting plates which may contain a flange such that squeezing the opposing flanges together can cause inward forces on the sealing blocks. Some mounting plates may contain backing plates which align with the outer edges of the sealing blocks so as to further increase the inward force of the mounting plate onto the sealing blocks.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
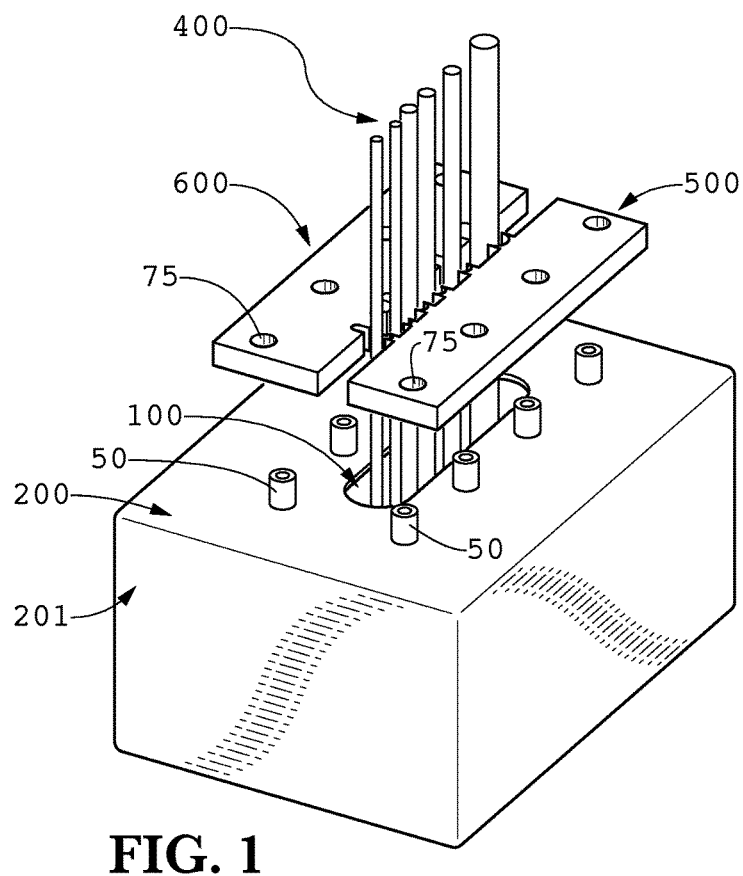
FIG. 1 is a partially exploded perspective view of the sealing blocks prior to being positioned on the posts.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a partially exploded perspective view of the sealing blocks 500 and 600 prior to being positioned on the posts 50. In this view, the wiring 400 is exiting a cavity 201 through the interface 200 by passing through an opening 100. At least one pair of posts 50 are positioned on opposing sides of the opening 100. Each of the sealing blocks 500 and 600 preferably contain apertures 75 which are sized and positioned to accept a post 50.

Figure 2:
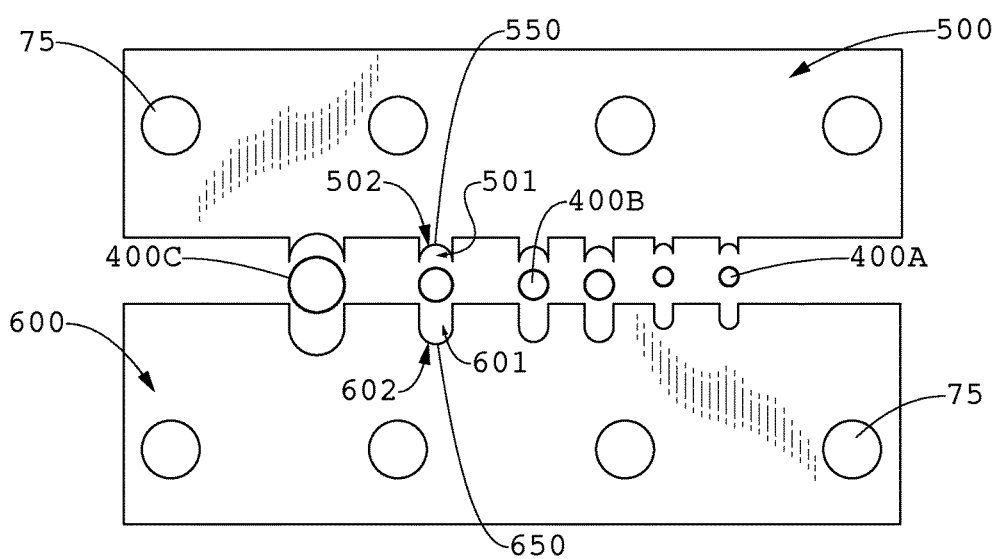
FIG. 2 is a top planar view of the sealing blocks and their interaction with the wiring.

FIG. 2 is a top planar view of the sealing blocks 500 and 600 and their interaction with the wiring 400. Here, three different diameters or wiring are shown varying from the smallest diameter wire 400A to the largest diameter wire 400C. In this embodiment, the first sealing block 500 contains rounded protrusions 501 while the second sealing block 600 contains rounded recesses 601. Preferably, the rounded recesses 601 are sized to be able to at least partially accept the rounded protrusions 501. Both the rounded recesses 601 and the rounded protrusions 501 should contain a round 602/502 at the apex 650/550 of the recess/round that closely matches the radius dimension of the wiring 400A-400C. In a preferred embodiment, the round 502 on the protrusion 501 is approximately 5% larger than the radius of the wire and the round 602 on the recess 601 is approximately 5% smaller than the radius of the wire. Further, in some embodiments the width of the protrusion 501 is approximately 5% larger than the width of the recess 601.

Figure 3:
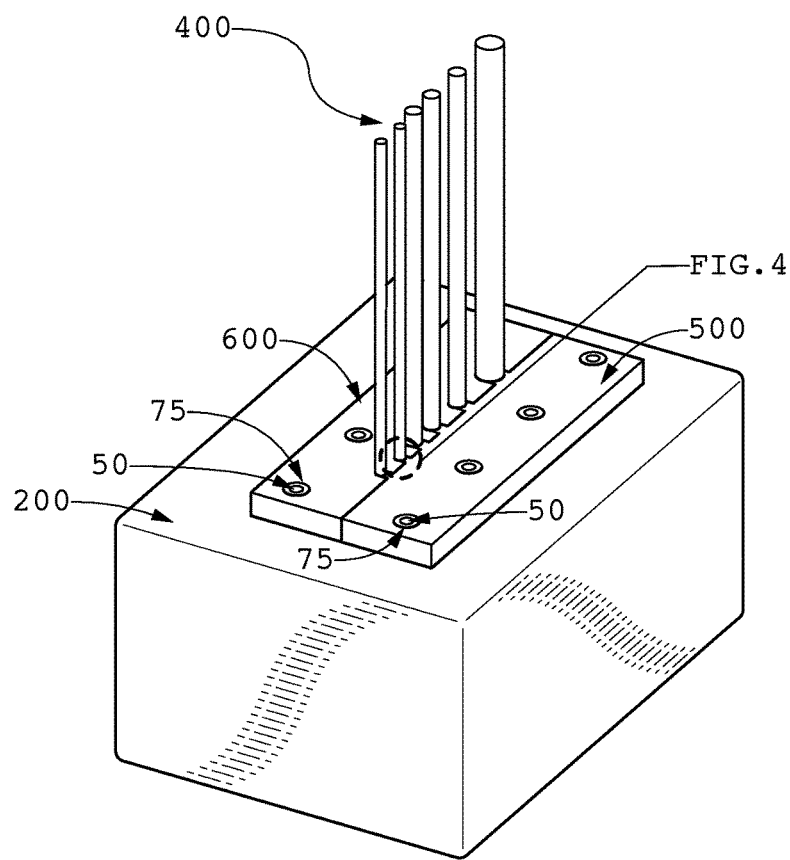
FIG. 3 is a perspective view of the blocks after being placed on the posts and showing the location of Detail A.
Figure 4:
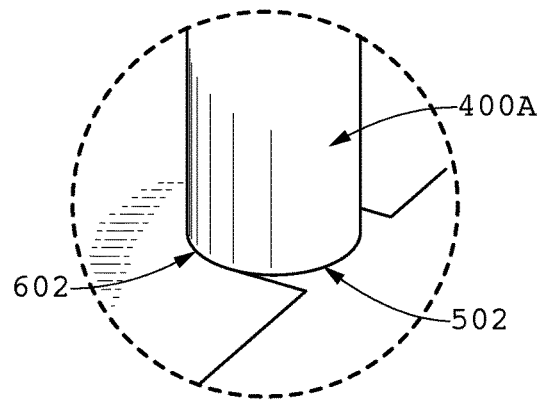
FIG. 4 is a perspective detailed view of Detail A.

FIG. 3 is a perspective view of the blocks 500 and 600 after being placed on the posts 50 and showing the location of Detail A. As the apertures 75 accept the posts 50, the recesses 601 of the second sealing block 600 may accept the protrusions 501 of the first sealing block 500. FIG. 4 is a perspective detailed view of Detail A. As shown, preferably the round 602 of the recess 601 surrounds at least a first portion of the wire 400A. Also preferably the round 502 of the protrusion 501 surrounds at least a second portion of the wire 400A. In a preferred embodiment, the rounds 602 and 502 each preferably surround approximately half of the wire's circumference.

Figure 5:
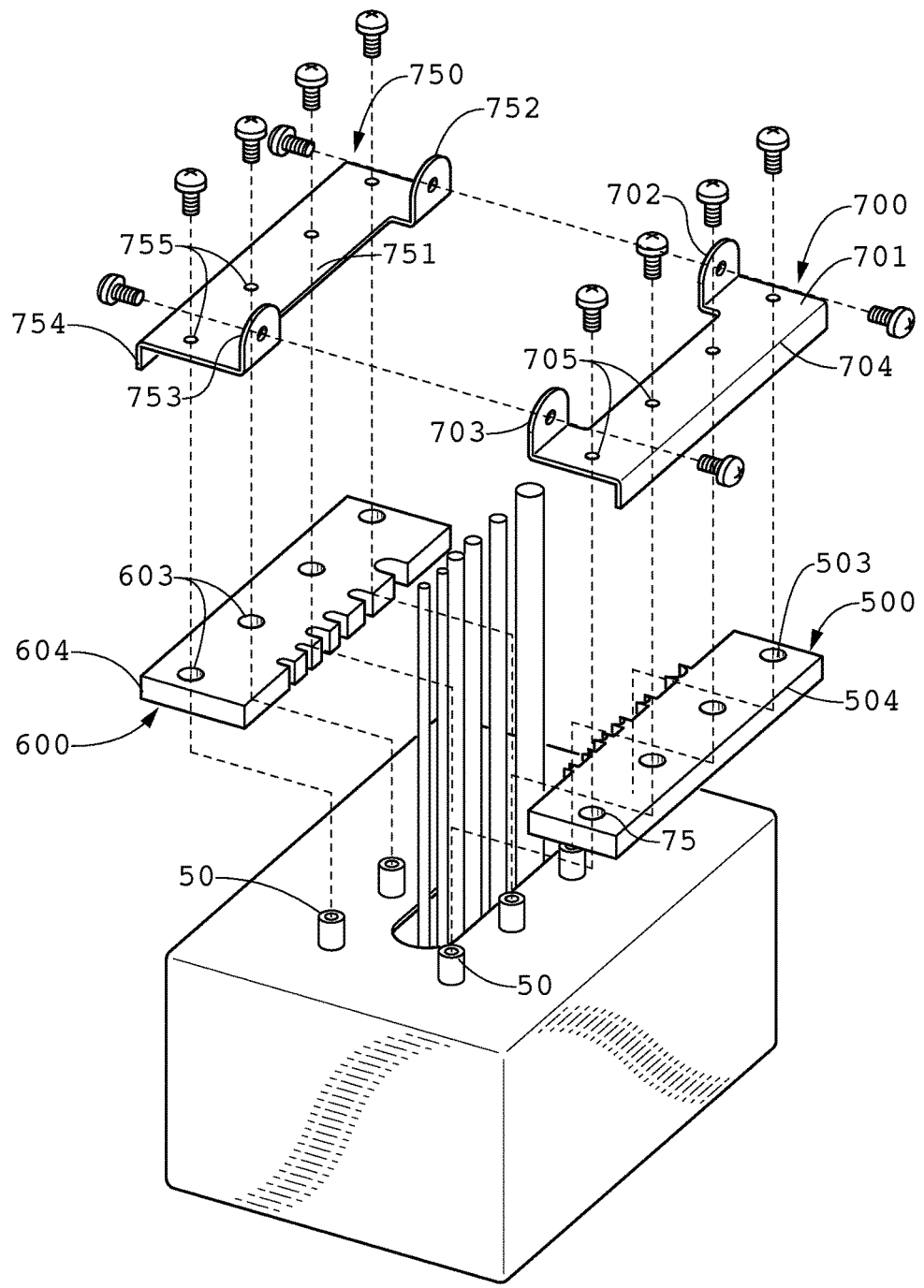
FIG. 5 is an exploded perspective view of one embodiment for assembling an exemplary embodiment of the device.

FIG. 5 is an exploded perspective view of one embodiment for assembling an exemplary embodiment of the device. Here, the first sealing block 500 contains a substantially planar top surface 503 and a substantially planar side surface 504 which is substantially perpendicular to the top surface 503. Similarly, the second sealing block 600 contains a substantially planar top surface 603 and a substantially planar side surface 604 which is substantially perpendicular to the top surface 603. In this embodiment, a first mounting plate 700 is substantially planar and adapted to fit atop the top surface 503 of the first sealing block. Similarly, a second mounting plate 750 is substantially planar and adapted to fit atop the top surface 603 of the second sealing block 600.

In one embodiment, the first mounting plate 700 contains at least one aperture 705 which may be aligned with the apertures 75 in the first sealing block 500. Similarly, the second mounting plate 750 contains at least one aperture 755 which may be aligned with the apertures 75 in the second sealing block 600. To secure these mounting plates and the sealing blocks, the posts 50 may be threaded and fasteners may be inserted through the apertures 705 in the first mounting plate 700, through the apertures 75 in the first sealing block 500, and tightened into the posts 50. Similarly, fasteners may be inserted through the apertures 755 in the second mounting plate 750, through the apertures 75 in the second sealing block 600, and tightened into the posts 50.

Optionally, at least one flange 702 may extend substantially perpendicularly from the top surface 701 of the first mounting plate 700. Also optionally, at least one flange 752 may extend substantially perpendicularly from the top surface 751 of the second mounting plate 750. These flanges 702 and 752 may be squeezed together in any number of ways to tighten the sealing blocks against the wiring. The flanges may be squeezed by clamps, fasteners tightening into apertures in the flanges, machine screws/bolts with nuts, or similar. An exemplary embodiment may also contain an additional flange 703 on the first mounting plate 700 and an additional flange 753 on the second mounting plate.

In a preferred embodiment, the first mounting plate 700 also includes a backing plate 704 extending downward and substantially perpendicularly from the top surface 701. Similarly, the second mounting plate 750 would also include a backing plate 754 extending downward and substantially perpendicularly from the top surface 751. When utilizing the optional backing plate 704, it may be preferable to provide an outside edge 504 on the first sealing block 500 which extends substantially perpendicularly from the top surface 503. Similarly, when utilizing the optional backing plate 754, it may be preferable to provide an outside edge 604 on the second sealing block 600 which extends substantially perpendicularly from the top surface 603. During assembly of this embodiment, the backing plates 704/754 can be positioned adjacent to the outside edges 504/604 such that when the two mounting plates 700/750 are squeezed together there is an inward force applied by the backing plates 704/754 onto the sealing blocks 500/600 so as to provide a tighter seal with the wiring.

Figure 6:
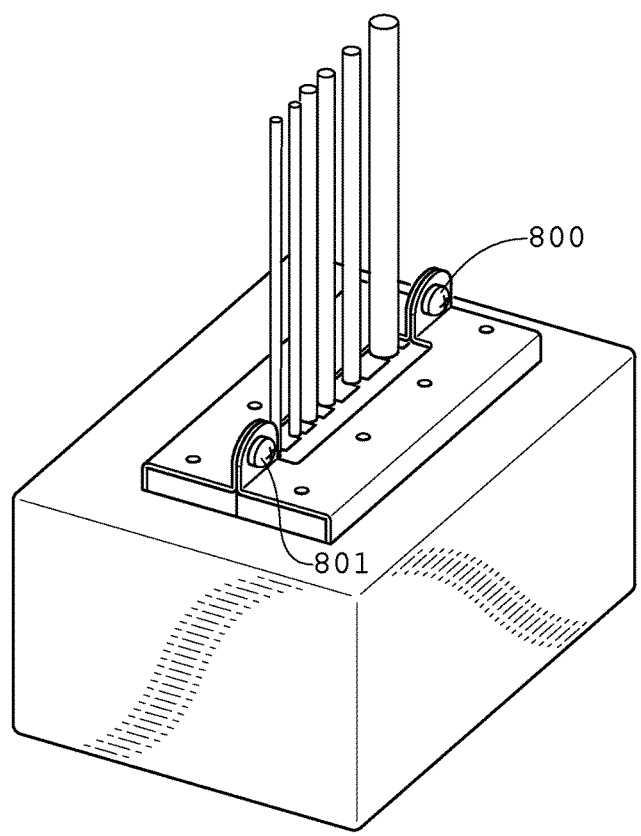
FIG. 6 is a perspective view of an exemplary embodiment after installing fasteners through the flanges of the mounting plates.

FIG. 6 is a perspective view of an exemplary embodiment after installing fasteners 800 through the flanges of the mounting plates. Here, a nut 801 has been positioned opposite the fasteners 800 so that rotation of the fastener 800 within the nut 801 causes the flanges to squeeze together.

Figure 7:
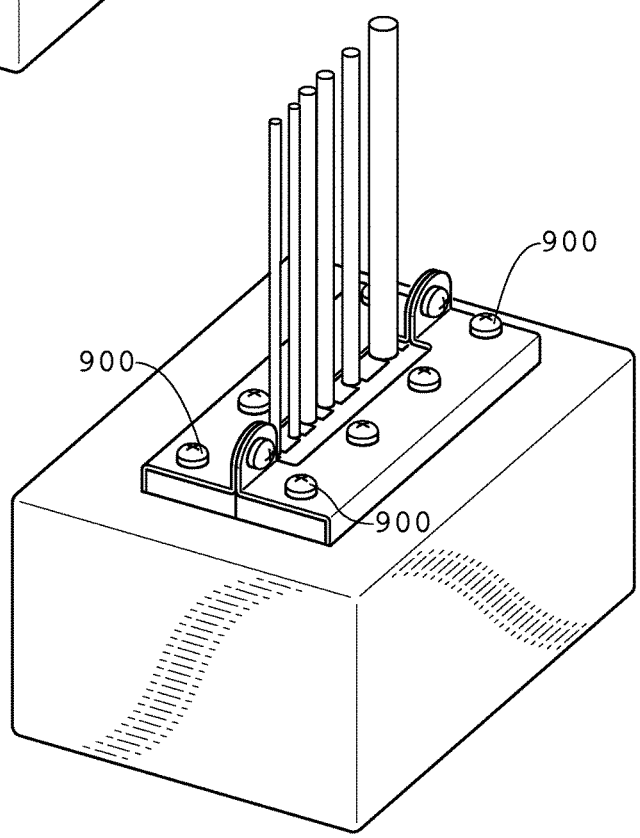
FIG. 7 is a perspective view of an exemplary embodiment after installing fasteners through the top surface of the mounting plates and into threaded posts.

FIG. 7 is a perspective view of an exemplary embodiment after installing fasteners 900 through the top surface of the mounting plates and into threaded posts.

The sealing blocks can be any number of materials, but would preferably be a softer plastic, rubber, or elastomeric material. An exemplary embodiment may utilize rubber having a durometer between 40 A-60 A. The mounting plates can be any number of rigid materials, but would preferably be a metallic, plastic, or composite material.

Figure 8:
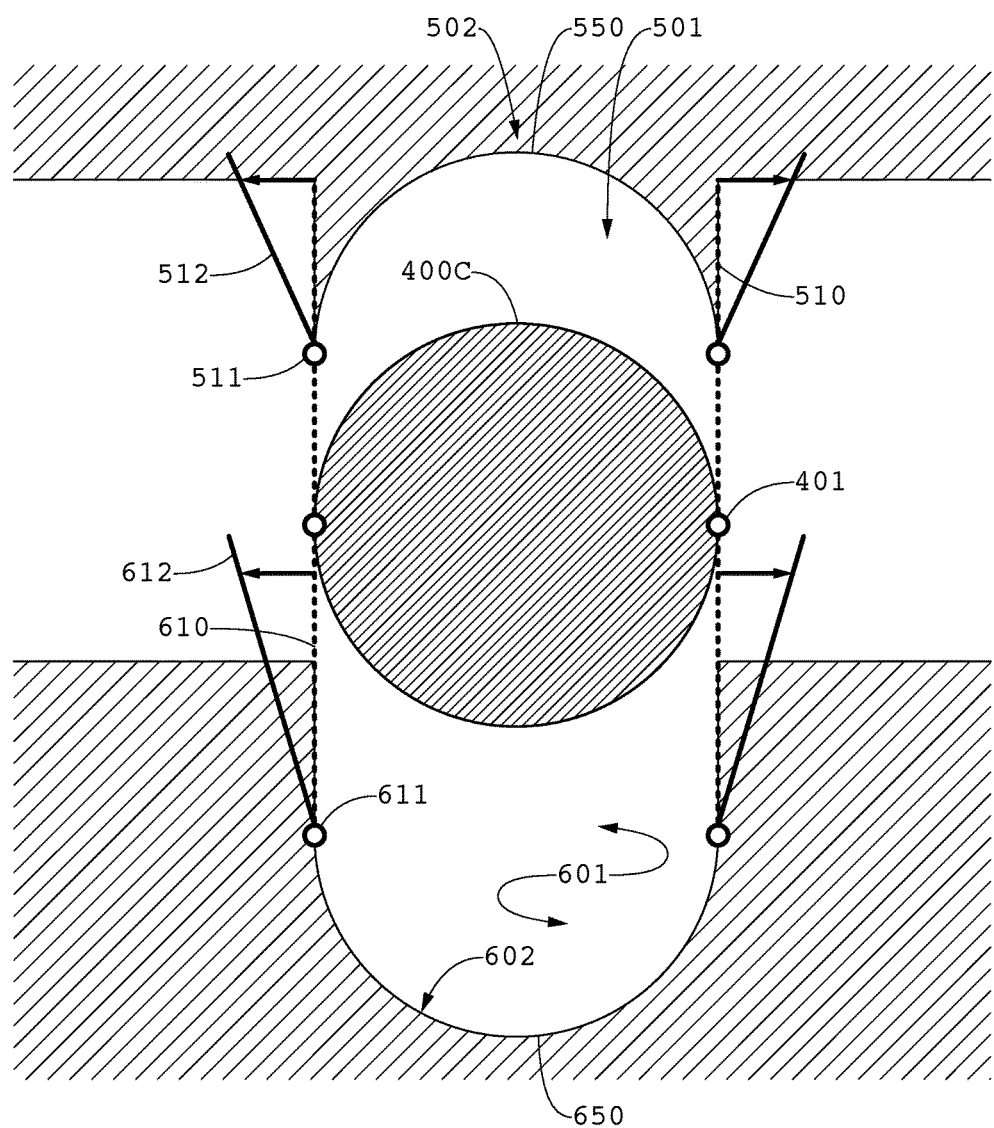
FIG. 8 is a top planar view of the optional draft angles for the rounded protrusions and rounded recesses in a preferred embodiment.

FIG. 8 is a top planar view of the optional draft angles for the rounded protrusions 501 and rounded recesses 601 in a preferred embodiment. Taking the rounded protrusion 501 for example, as the portion 510 extends outward from the body of the sealing block there is a point 511 just before the round 502 begins. Similarly for the rounded recess 601, as the portion 610 extends into the body of the sealing block there is a point 611 just before the round 602 begins. From here, an imaginary line is drawn from the point 611 to the tangent point 401 of the wire 400C. Similarly, an imaginary line is drawn from the point 511 to the tangent point 401 of the wire 400C.

To create the draft angle for the protrusion 501 in a preferred embodiment, the imaginary line between the points 511/401 is rotated outwardly about the tangent point 401. To create the draft angle for the recess 601 in a preferred embodiment, the imaginary line between the points 611/401 is rotated outwardly about the point 611. The amount of outward rotation can be measured in degrees, where a preferred amount of draft would be 1-15 degrees, with an exemplary embodiment having a draft angle between approximately 4-6 degrees. It is preferred that the portions 510 are drafted with a similar angle (i.e. so that they are approximately symmetrical about the centerline of this top planar view). Similarly, it is preferred that the portions 610 are drafted with a similar angle. Finally, it may also be preferable that both portions 510 and 610 have the same approximate draft angle.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A device for sealing an interface having an opening for a wire to pass through the interface, the device comprising:
a first sealing block having a body portion and a first protrusion that extends outwardly from the body portion of the first sealing block, the first protrusion comprised of two points and a concave recess formed between the two points, the concave recess sized to surround a first portion of the wire;
a second sealing block having a body portion with a recess extending inwardly into the body portion of the second sealing block, the recess in the second sealing block sized to surround a second portion of the wire; and
wherein the recess in the second sealing block accepts the first protrusion in the first sealing block.

2. The sealing device of claim 1, wherein:
the first protrusion extends outwardly from a front surface of the body portion; and
the two points extend substantially in line with one another and along an axis extending substantially parallel with the front surface of the first sealing block.

3. The sealing device of claim 1 wherein:
the first portion of the wire is approximately half the circumference of the wire; and
the second portion of the wire is approximately half the circumference of the wire.

4. The sealing device of claim 1 wherein:
the first protrusion of the first sealing block is adapted to fit at least partially within the recess of the second sealing block.

5. The sealing device of claim 1 further comprising:
a first mounting plate adapted to fit over the first sealing block and having a top surface with a flange extending from the top surface; and
a second mounting plate adapted to fit over the second sealing block and having a top surface with a flange extending from the top surface.

6. The sealing device of claim 5 further comprising:
a means for squeezing the flanges together.

7. The sealing device of claim 5 further comprising:
an aperture in each flange; and
a threaded fastener adapted to fit within each aperture and draw the two flanges together when rotated within the aperture.

8. The sealing device of claim 5 further comprising:
an aperture in each flange;
a nut aligned with the apertures in each flange; and
a threaded fastener adapted to pass through the apertures and thread into the nut.

9. The sealing device of claim 5 further comprising:
an aperture on the top surface of the first mounting plate and aligned with the aperture in the first sealing block; and
an aperture on the top surface of the second mounting plate and aligned with the aperture in the second sealing block.

10. The sealing device of claim 9 further comprising:
fasteners adapted to pass through the apertures in the mounting plates and sealing blocks; and
posts located on the interface configured to receive the fasteners.

11. A device for sealing an interface having an opening for a wire to pass through the interface, the device comprising:
a first sealing block having a body portion and a first protrusion that extends outwardly from the body portion of the first sealing block, the first protrusion comprised of two points and a concave recess formed between the two points, the concave recess sized to approximately the same radius as the wire;
a second sealing block having a body portion with a recess extending inwardly into the body portion of the second sealing block, the recess in the second sealing block sized to approximately the same radius as the wire;
a first and second post located on the interface below the first and second sealing blocks, respectively, each of said posts configured to receive a fastener sized to pass through the sealing blocks and into the posts;
wherein the recess in the second sealing block accepts the first protrusion in the first sealing block.

12. The sealing device of claim 11 wherein:
the sealing blocks are comprised of rubber.

13. The sealing device of claim 11 further comprising:
a first mounting plate adapted to fit over the first sealing block and having a top surface with a flange extending upward from the top surface;
a second mounting plate adapted to fit over the second sealing block and having a top surface with a flange extending upward from the top surface; and
a means for squeezing the flanges together.

14. The sealing device of claim 13 further comprising:
a substantially planar top surface on each sealing block;
a substantially planar edge surface on each sealing block which extends substantially perpendicularly from the top surface; and
a backing plate on each of the mounting plates which extends downward and substantially perpendicular to the top surface of the mounting plate, where the backing plates are positioned adjacent to the edge surfaces of the sealing blocks.

15. The sealing device of claim 13 wherein the means for squeezing the flanges together comprises
an aperture in each flange;
a nut aligned with the apertures in each flange; and
a threaded fastener adapted to pass through the apertures and thread into the nut.

16. The sealing device of claim 11, wherein the first sealing block is further comprised of a second protrusion that extends outwardly from the body portion of the first sealing block, the second protrusion comprised of two points and a concave recess formed between the two points, the concave recess of the second protrusion sized to surround a first portion of a second wire having a different radius from the wire for the first protrusion;
wherein the second sealing block is further comprised of a second recess extending inwardly into the body portion of the second sealing block, the recess in the second sealing block sized to surround a second portion of the second wire; and
wherein the second recess in the second sealing block accepts the second protrusion in the first sealing block.

17. The sealing device of claim 11, wherein the first sealing block is further comprised of a second protrusion that extends outwardly from the body portion of the first sealing block, the second protrusion comprised of two points and a concave recess formed between the two points, the concave recess of the second protrusion sized to surround a first portion of a second wire having a different radius from the wire for the first protrusion;
   wherein the second sealing block is further comprised of a second recess extending inwardly into the body portion of the second sealing block, the recess in the second sealing block sized to surround a second portion of the second wire; and
   wherein the second recess in the second sealing block accepts the second protrusion in the first sealing block.

* * * * *